United States Patent Office 3,069,446
Patented Dec. 18, 1962

3,069,446
TITANIUM HALIDE DERIVATIVES
Perry A. Argabright, Piscataway, and Edwin A. Schmall, Roselle Park, N.J., assignors to Esso Research and Engineering Company, a corporation of Delaware
No Drawing. Filed Dec. 3, 1958, Ser. No. 777,828
6 Claims. (Cl. 260—429.5)

This invention relates to novel derivatives of titanium halides. More particularly, it relates to the reaction products of titanium halides with organic electron donors, these reaction products upon proper activation being active catalysts for the low pressure polymerization of alpha olefins.

The low pressure polymerization and copolymerization of alpha olefins and diolefins with catalyst systems made up of a partially reduced, heavy, transition metal halide and a reducing metal-containing compound, to high density, often isotactic, high molecular weight, solid, relatively linear products has been assuming ever increasing importance and is now well known.

The alpha olefinic feeds utilized in polymerization and copolymerization include ethylene, propylene, butene-1, heptene-1, dodecene-1, etc., with ethylene and propylene preferred.

Among the diolefins that can be used in copolymerization are butadiene, isoprene, piperylene, vinylcyclohexene, cyclopentadiene, 1,4-pentadiene, etc. It is to be understood that wherever the term "polymer" is used herein, it connotes both homo- and copolymers.

The low pressure process is described in the literature, e.g. see Belgian Patent 538,782 and "Scientific American," September 1957, pages 98 et seq.

It has now been found that novel derivatives of titanium halides are useful for this type of polymerization. These novel derivatives are the reaction products of titanium halides with organic electron donors as explained in further detail below. The reaction products on proper activation are useful in the low pressure polymerization of alpha olefins. Alone or activated, they are possessed of catalytic activity for isomerization, reduction, oxidation, etc.

The titanium halides utilized in the preparation of the reaction products can be titanium chlorides, bromides or iodides with the first two preferred, having a minimum of two halogen atoms, e.g. $TiCl_2$, $TiCl_3$, $TiBr_2$, $TiBr_3$ and $TiCl_4$. These materials are reacted with organic electron donors.

Particularly preferred electron donors are triphenylchloromethane, diphenyl-chloromethane, benzyl sulfide, phenyl urethane, and tetraethyl-ammonium bromide.

An electron donor suitable for the needs of this invention may be of two types.

(1) A compound capable of donating a pair of electrons to the titanium halide resulting in a complex which contains a cation of marked stability.

Example:

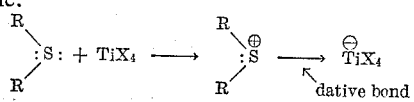

(2) A compound capable of donating an anion to the titanium halide thereby producing a cation of high stability.

Examples:

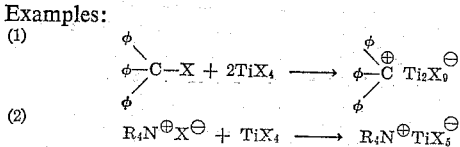

The exact structure of the reaction product is very difficult to postulate because of the complicated nature of the molecule. Because of that, it should be understood that where stoichiometric formulae are shown, they are based on halogen analysis and are not intended to connote the actual molecular arrangement. In general, the molecular ratio of titanium halide to organic electron donor is in the range of 1 to 1 to 4 to 1.

The titanium complexes are prepared by mixing the two components in an inert hydrocarbon diluent. In individual preparations one or both of the reactants may be partly or completely soluble in the diluent, e.g., $TiCl_4$, $\phi_3CCl$, $(\phi_2CH_2)_2S$, $\phi_2CHCl$, $TiBr_4$. In each case, the procedure involves stirring the reaction mixture (at atmosphere pressure) in an inert atmosphere ($N_2$) for one to several hours and at a temperature between about 25° C. and the boiling point of the diluent. The resulting slurry is then filtered and the solid product washed with several portions of heptane. The complex is dried by vacuum at room temperature. Typical reaction conditions are cited in Table 1. All the products are colored (red to green) solids, decomposed by air or moisture, but stable in a nitrogen atomsphere.

The resulting reaction products are activated with a metal alkyl compound, i.e. a trialkyl derivative of aluminum, gallium, and indium, e.g. aluminum triethyl. The two components in the proper proportions are admixed in an inert solvent, e.g. a $C_3$ to $C_{18}$ paraffin such as isopentane or n-heptane, or an aromatic such as benzene or xylene, at temperatures between 0° and 150° C. Slurries of dark colored reduction products are obtained with some solubility in the diluent. The solubility of the resulting products depends on the nature of the titanium complex. The $TiCl_4 \cdot \phi CH_2$—S—$CH_2\phi$ complex reacts with $AlEt_3$ to yield products that are nearly completely soluble in n-heptane.

In general, the preferred ratio of alkyl compound to the titanium halide reaction product is in the range of 1 to 1 to 10 to 1.

In the polymerization, the monomers are contacted with the resulting catalyst in the presence of the same or differing inert hydrocarbon solvent such as isopentane, n-heptane, xylene, etc. The polymerization is conveniently effected at temperatures of about 0° to 100° C. and pressures ranging from about 0 to 500 p.s.i.g., usually 0 to 100 p.s.i.g. The catalyst concentration in the polymerization zone is preferably in the range of about 0.03 to 0.5 wt. percent based on total liquid and the polymer product concentration in the polymerization zone is preferably kept between about 5 to 15 wt. percent based on total contents so as to allow easy handling of the polymerized mixture. The proper polymer concentration can be obtained by having enough of the inert diluent present or by stopping the polymerization short of 100% conversion of the monomers. When the desired degree of polymerization has been reached, a $C_1$ to $C_8$ alkanol such as methyl alcohol, isopropyl alcohol or n-butyl alcohol, desirably in combination with a chelating agent for polymer deashing such as acetylacetone is normally added to the reaction mixture for the purpose of dissolving and deactivating the catalyst and for precipitating the polymer product from solution. After filtration, the solid polymer may be further washed with water, alcohol or acid such as hydrochloric acid, dried, compacted and packaged.

The polymers produced have molecular weights in the range of about 50,000 to 300,000 or even as high as 3,000,000 as determined by the intrinsic viscosity method using the I. Harris Correlation (J. Polymer Science, 8, 361, 1952). The polymers can have a high degree of crystallinity and a low solubility in n-heptane.

It is to be understood that the term "low pressure" polymer as used herein connotes material prepared in the indicated manner.

The advantages of this invention will be better understood by reference to the following examples:

EXAMPLE I

Various derivatives of titanium chlorides and bromides were prepared with organic electron donors. The reaction products were activated with aluminum triethyl in a molar ratio of 2:1 based on the titanium. These catalyst systems were then utilized in the polymerization of ethylene. The details of conditions, yields, etc. for the preparation of the titanium complexes are shown in Table 1 below.

*Table 1*

| Metal halide | Organic component | Conditions [1] | Yield, g. | Stoichiometry [2] |
|---|---|---|---|---|
| 25 g. TiCl$_4$ | 19.0 g. $\phi_3$CCl [3] | Room temp.—40 hrs | 31.0 | $\phi_3$CCl-(TiCl$_4$)$_2$. |
| 25 g. TiCl$_3$ | 23.0 g. $\phi_3$CCl [3] | 75° C.—40 hrs | 42.0 | $\phi_3$CCl-(TiCl$_3$)$_2$. |
| 25 g. TiCl$_2$ | 15.0 g. $\phi_3$CCl [3] | 75° C.—40 hrs | 28.8 | $\phi_3$CCl-(TiCl$_2$)$_4$. |
| 25 g. TiCl$_4$ | 13.0 g. $\phi_2$CHCl [4] | Room temp.—90 hrs | 11.5 | ($\phi_2$CHCl)$_2$-TiCl$_4$. |
| 25 g. TiCl$_4$ | 14.5 g. ($\phi$CH$_2$)$_2$S [5] | Room temp.—40 hours | 24.0 | ($\phi$CH$_2$)$_2$S-TiCl$_4$. |
| 25 g. TiCl$_4$ | 9.5 g. $\phi$NHCO$_2$Et [6] | Room temp.—45 hrs | 19.8 | $\phi$NHCO$_2$Et-TiCl$_4$. |
| 25 g. TiBr$_4$ | 7.5 g. Et$_4$NBr [7] | Room temp.—90 hrs | 19.0 | Et$_4$NBr-TiBr$_4$. |

[1] Reactants diluted with 200 ml. normal heptane.
[2] Indicated by halogen analysis.
[3] Triphenyl-chloromethane.
[4] Diphenyl-chloromethane.
[5] Benzyl sulfide.
[6] Phenyl urethane.
[7] Tetraethyl-ammonium bromide.

The relative activities of the catalyst system (based on weight of said polymer) were:

*Table 2*

Catalyst: Relative activity
$\phi_3$CCl—(TiCl$_3$)$_2$ -------------------- 2.8
($\phi_2$CHCl)$_2$—TiCl$_4$ -------------------- 2.8
$\phi_3$CCl—(TiCl$_4$)$_2$ -------------------- 2.3
$\phi_3$CCl—(TiCl$_2$)$_4$ -------------------- 1.9
$\phi$NHCO$_2$Et—TiCl$_4$ -------------------- 1.3
($\phi$CH$_2$)$_2$S—TiCl$_4$ -------------------- 1.0
Et$_4$NBr—TiBr$_4$ -------------------- <1.0
TiCl$_2$ -------------------- (trace of polymer)

It should be noted from this table that TiCl$_2$-aluminum triethyl alone only gave traces of polymer. On the other hand, the use of the trityl chloride reaction product of TiCl$_2$ gave an active catalyst.

EXAMPLE II

A similar example was run as in Example I except that propylene was polymerized. Again the complexed TiCl$_2$ system activated with aluminum triethyl gave a much more active catalyst than TiCl$_2$ alone so activated. The results and conditions are shown in Table 3 below. The compound designations are again the stoichiometric ones as explained previously.

as illustrations and that modifications may be made without departing from the spirit of the invention.

What is claimed is:

1. As a new composition of matter, the reaction product of a titanium halide consisting only of titanium and halogen having a minimum of two halogen atoms and an organic electron donor selected from the group consisting of triphenyl chloromethane, diphenyl chloromethane, benzyl sulfide and phenyl urethane, the molar ratio of titanium halide to organic electron donor being in the range of 1:1 to 4:1.

2. As a new composition of matter, the reaction product of TiCl$_4$ and triphenyl chloromethane, the molar ratio of titanium compound to triphenyl chloromethane being in the range of 1:1 to 4:1.

3. As a new composition of matter, the reaction product of TiCl$_3$ and triphenyl chloromethane, the molar ratio of titanium compound to triphenyl chloromethane being in the range of 1:1 to 4:1.

4. As a new composition of matter, the reaction product of TiCl$_2$ and triphenyl chloromethane, the molar ratio of titanium compound to triphenyl chloromethane being in the range of 1:1 to 4:1.

5. As a new composition of matter, the reaction product of TiCl$_4$ and diphenyl chloromethane, the molar ratio of titanium compound to diphenyl chloromethane being in the range of 1:1 to 4:1.

6. As a new composition of matter, the reaction product of TiCl$_4$ and phenyl urethane, the molar ratio of titanium compound to urethane being in the range of 1:1 to 4:1.

*Table 3*

PROPYLENE POLYMERIZATION IN 300 ML. ROCKING BOMB AT 80° C. FOR 2 HOURS

| Complex | $\phi_3$CCl—(TiCl$_3$)$_2$ | | | $\phi_3$CCl—(TiCl$_2$)$_4$ | | TiCl$_2$ | ($\phi_2$CHCl)$_2$—TiCl$_4$ | | $\phi$NHCO$_2$Et—TiCl$_4$ | |
|---|---|---|---|---|---|---|---|---|---|---|
| Weight, g | 0.75 | 0.59 | 0.59 | 0.75 | 0.75 | 0.48 | 0.57 | 0.57 | 0.71 | 0.36 |
| Metal alkyl | AlEt$_3$ | GaEt$_3$ | InEt$_3$ | AlEt$_3$ | AlEt$_3$ | AlEt$_3$ | AlEt$_3$ | AlEt$_3$ | AlEt$_3$ | AlEt$_3$ |
| Weight, g | 0.57 | 0.79 | 1.01 | 0.57 | 0.57 | 0.57 | 0.57 | 0.57 | 1.14 | 0.57 |
| Propylene, g | 150 | 75 | 75 | 75 | 75 | 75 | 75 | 75 | 75 | 75 |
| Weight percent | 47 | 64 | 64 | 64 | 69 | 69 | 64 | 69 | 64 | 69 |
| Diluent | Xylene | Xylene | Xylene | Xylene | n-Heptane | n-Heptane | Xylene | n-Heptane | Xylene | n-Heptane |
| Metal alkyl/Ti ratio | 4 | 2.5 | 2.5 | 1.25 | 1.25 | 10 | 3 | 3 | 5 | 5 |
| Cat. concn., weight percent | 0.23 | 0.5 | 0.5 | 0.64 | 0.69 | 0.44 | 0.48 | 0.52 | 0.60 | 0.33 |
| Solid polymer, g | 120 | 29 | 23 | 49 | 53 | 19 | 20 | 36 | 1 | 4 |
| Cat. eff., g./g | 91 | 21 | 14 | 38 | 40 | 18 | 18 | 32 | 0.5 | 4 |
| Percent conv | 80 | 39 | 31 | 65 | 71 | 25 | 27 | 48 | 1 | 5 |

The advantages of this invention will be apparent to those skilled in the art. Novel materials are made available which can have great importance in catalytic operations.

Since the reaction between TiCl$_4$ and trityl chloride is nearly quantitative and gives an intensely colored product (yellow) it follows that trityl chloride can serve as either a quantitative or qualitative analytical reagent for the detection of TiX$_4$.

It is to be understood that this invention is not limited to the specific examples which have been offered merely References Cited in the file of this patent

UNITED STATES PATENTS

| 2,879,263 | Anderson et al. | Mar. 24, 1959 |
| 2,886,560 | Weber | May 12, 1959 |
| 2,886,561 | Reynolds et al. | May 12, 1959 |
| 2,903,487 | Coffield | Sept. 8, 1959 |
| 2,905,645 | Anderson et al. | Sept. 22, 1959 |
| 2,912,424 | Cash | Nov. 10, 1959 |
| 2,925,392 | Seelbach et al. | Feb. 16, 1960 |
| 2,935,522 | Samour | May 3, 1960 |

FOREIGN PATENTS

| 533,362 | Belgium | May 16, 1955 |